(12) United States Patent
Dezonno

(10) Patent No.: US 7,027,585 B2
(45) Date of Patent: Apr. 11, 2006

(54) WEB CALLBACK THROUGH MULTIMEDIA DEVICES

(75) Inventor: Anthony J. Dezonno, Bloomingdale, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 341 days.

(21) Appl. No.: 10/156,406

(22) Filed: May 28, 2002

(65) Prior Publication Data
US 2003/0223571 A1 Dec. 4, 2003

(51) Int. Cl.
H04M 3/00 (2006.01)

(52) U.S. Cl. .............................. 379/265.09; 379/88.13; 379/908

(58) Field of Classification Search ........... 379/265.01, 379/265.02, 265.09, 88.13, 88.17, 900, 908
See application file for complete search history.

(56) References Cited

U.S. PATENT DOCUMENTS

| | | | |
|---|---|---|---|
| 5,764,736 A | 6/1998 | Shachar et al. | |
| 5,838,682 A | 11/1998 | Dekelbaum et al. | |
| 5,884,032 A | 3/1999 | Bateman et al. | |
| 5,991,394 A | 11/1999 | Dezonno et al. | |
| 6,061,347 A | 5/2000 | Hollatz et al. | |
| 6,130,933 A * | 10/2000 | Miloslavsky | 379/90.01 |
| 6,141,413 A * | 10/2000 | Waldner et al. | 379/88.17 |
| 6,337,858 B1 * | 1/2002 | Petty et al. | 370/356 |
| 6,438,599 B1 * | 8/2002 | Chack | 709/229 |
| 6,493,447 B1 * | 12/2002 | Goss et al. | 379/265.09 |
| 6,654,457 B1 * | 11/2003 | Beddus et al. | 379/265.02 |
| 2001/0038624 A1 * | 11/2001 | Greenberg et al. | 370/352 |
| 2002/0120686 A1 * | 8/2002 | Schell et al. | 709/204 |

OTHER PUBLICATIONS

Interactive Intelligence Products—Interaction Web.

* cited by examiner

Primary Examiner—Bing Q. Bui
(74) Attorney, Agent, or Firm—Welsh & Katz, Ltd.

(57) ABSTRACT

A method and apparatus are provided for establishing a communication connection between a client of a website and an agent of the website. The method includes the steps of downloading a webpage from the website to the client, such webpage including an embedded agent access applet and a communication system port identifier of the agent, the communication port identifier of the agent being different than a communication port identifier of the web site, activating the agent access applet within the downloaded webpage and forming a communication connection between the client and the communication system port of the agent based upon operation of the activated applet.

35 Claims, 3 Drawing Sheets

WEB CALLBACK THROUGH MULTIMEDIA DEVICES

FIELD OF THE INVENTION

The field of the invention relates to communication systems and more particularly to contact centers.

BACKGROUND OF THE INVENTION

Contact centers are generally known. Such centers are typically used as a means of facilitating contact between an organization using the contact center and large numbers of persons through the Internet or through conventional telephone systems.

Contact centers have generally evolved from call centers. Call-centers typically include at least three elements: an automatic call distributor (ACD), a group of agents for handling the calls, and a host computer containing customer information. The individual agents of the groups of agents are each typically provided with a telephone console and a computer terminal. The telephone terminal is used to receive customer calls distributed to the agent by the ACD. The terminal may be used to retrieve customer records from the host.

Call centers are typically used to place and receive telephone calls. While they are relatively effective in receiving incoming telephone calls, they are often viewed much less effective in the context of placing outgoing calls. People who receive frequent calls from telemarketers, in fact, often find the calls intrusive and distasteful. The reaction of many people to telemarketers often defeats the purpose of the call.

As an alternative to telemarketing through call centers, many commercial, environmental and political organizations now rely on a website to spread their message. In the case of a website, an interested party may access the website at their leisure, browse its contents and download any interesting material.

In order to further enhance the effectiveness of websites, some organizations have begun to offer the option of receiving a return call from an agent of the website. Text windows have been provided through which a visitor may enter a telephone number for purposes of requesting a return call from an agent of the website.

While such utilities are effective, responses are often delayed or not returned. Further, users are often hesitant of entering a telephone number for fear of being placed on call lists for later telemarketing efforts. Accordingly, a need exists for a method of establishing a telephone connection between a computer user and website that does not involve the entry of contact information by the user.

SUMMARY

A method and apparatus are provided for establishing a communication connection between a client of a website and an agent of the website. The method includes the steps of downloading a webpage from the website to the client, such webpage including an embedded agent access applet and a communication system port identifier of the agent, said communication port identifier of the agent being different than a communication port identifier of the web site, activating the agent access applet within the downloaded webpage and forming a communication connection between the client and the communication system port of the agent based upon operation of the activated applet.

DETAILED DESCRIPTION OF AN ILLUSTRATED EMBODIMENT

Figure 1:
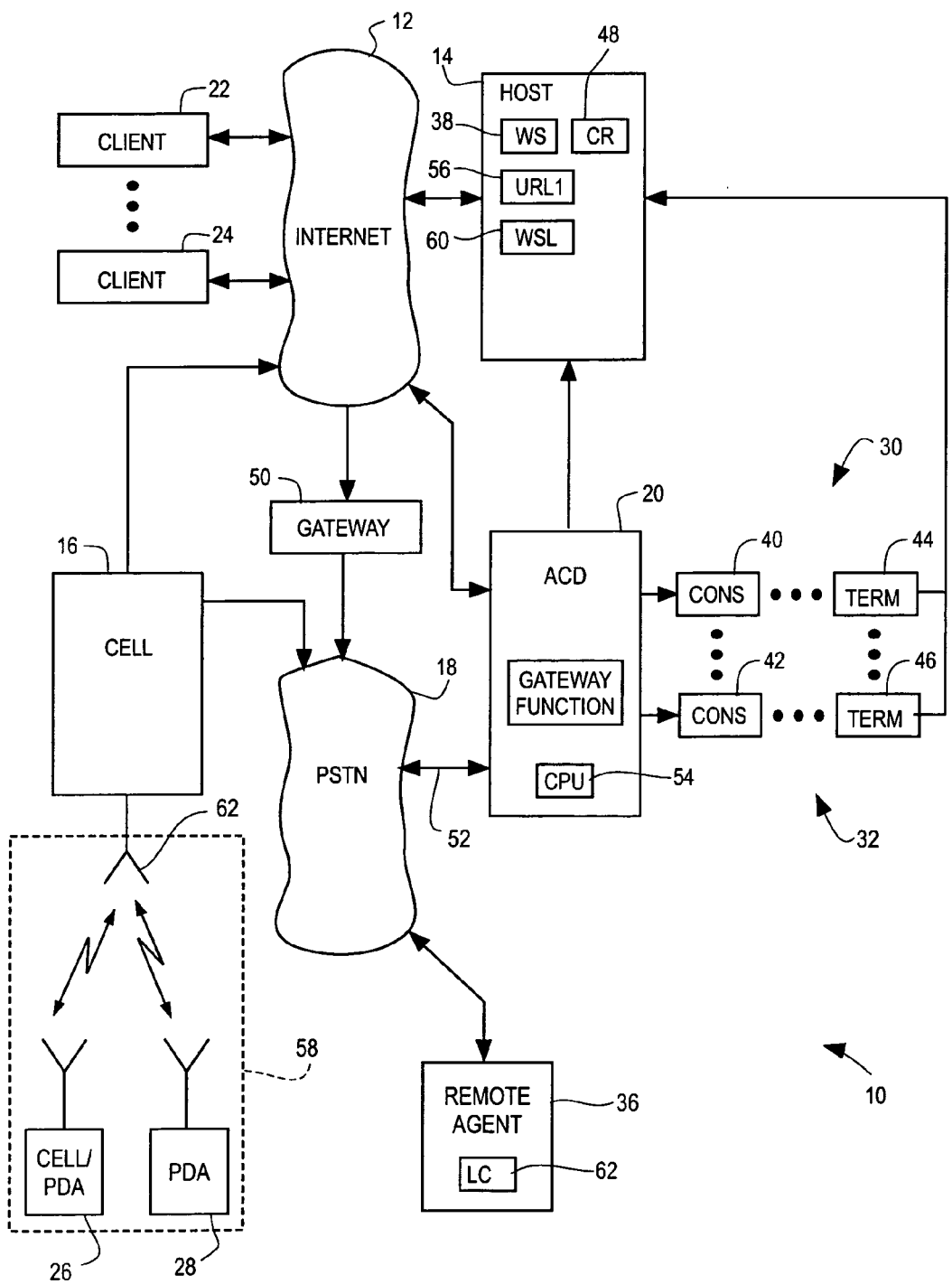
FIG. 1 depicts a system for providing web callback messages through multi-media devices, in a context of use under an illustrated embodiment of the invention.

FIG. 1 is a block diagram of a system 10 for processing multi-media messages, shown generally under an illustrated embodiment of the invention. While the system 10 may have many applications, it may be particularly useful in providing a pair of simultaneously available information paths that allow a computer user to access a website through the Internet while he/she is also conversing with a human agent of the website.

Under the illustrated embodiment, webpages may be downloaded through the Internet from a website to a browser through any of a number of remote devices (e.g., a computer terminal, palm pilot, cell phone with browser, etc.). Included within one or more of the webpages may be a softkey allowing connection to a human agent. Activation of the softkey may result in creation of an information path between the user and agent of the website.

The creation of the communication path with the agent may occur entirely under the control of programming information contained within the webpage. Further, the physical location of the agent is entirely programmable and may change from one webpage to another within the same website.

Turning now to the figures, FIG. 1 depicts a simplified layout of the system 10 in the context of communication systems 12, 18 and information paths connecting the systems 12, 18. As shown, a first set of terminals 22, 24 may access a website 38 of a host 14 of the system 10 through the Internet 12. The first set of terminals may be conventional computers (e.g., desktop, laptop, etc.). Each terminal 22, 24 may be provided with a soundblaster card and headset including an earphone and microphone for purposes of conversing with an agent of the website 38.

A second set of terminals 26, 28 may be portable devices that access the website 38 through a local cellular system 16 and the Internet 12. A first type of portable device 26 may be provided in the form of a cellular telephone, with a web browser and display (e.g., Sprint PCS, Motorola Accompli 009, etc.). A second type of portable device 28 may be provided in the form of a personal data assistant (PDA) with a cellular interface. While only one of each type of portable device 26, 28 is shown, it should be understood that any of a number of portable devices 26, 28 could be used within the system 10.

Figure 2:
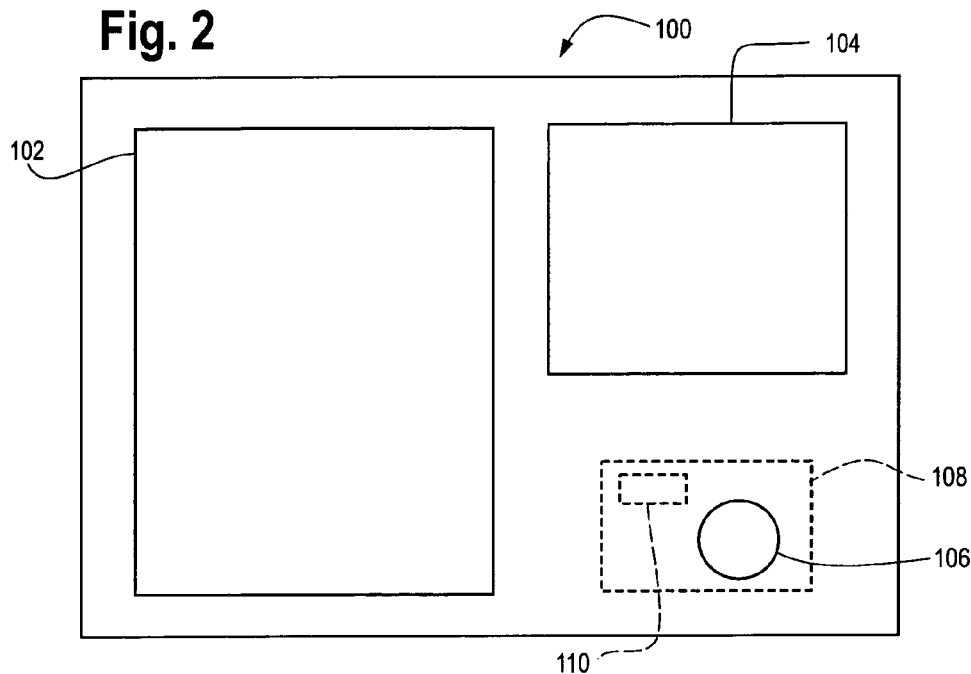
FIG. 2 depicts a webpage that may be downloaded by the website of FIG. 1.

From any one of the terminals 22, 24, 26, 28, webpages may be downloaded and displayed on a display associated with the terminal 22, 24, 26, 28. FIG. 2 depicts a webpage 100 that may be downloaded from the website 38. Included within the webpage 100 may be any of a number of information display area 102, 104.

The system 10 may be effectively used by any of a number of different types of organizations (e.g., an environmental organization, a political organization, a merchant, etc.) to setup contacts through information paths between external clients of the organization (e.g., a client using an communication device 22, 24, 26, 28) and agents of the organization (e.g., agents working at an agent station 30, 32, 36) for purposes of advancing the agenda of the organization.

Upon downloading the webpage 100, the user 22, 24, 26, 28 may review and/or print the information elements 102, 104. The webpage 100 may include one or more softkeys 106 for contacting an agent 30, 32, 36 of the website 38. (As used herein an agent of the website is a person employed by the owner or operator of the website and who is knowledgeable about the subject matter of the website 38 and who acts as an agent of the owner or operator for purposes of advancing the agenda of the owner or operator (e.g., taking donations, accepting orders, offering assistance in the use of the website, etc.).)

Associated with the softkey 106 may be an agent access applet 108. The agent access applet 106 may be downloaded to the client 22, 24, 26, 28 as part of the html file of the webpage 38. Within the applet 106 may be a communication system port identifier 110 (e.g., telephone number, URL, etc.) of an agent 30, 32, 36 of the website 38. As used herein, an agent access applet is a program downloaded within a webpage, that independently sets up and maintains a communication link between the client 22, 24, 26, 28 and an agent 30, 32, 36 of the webpage 100. The agent 30, 32, 36 may be associated with a predetermined communication system port that is independent of the website 38 providing the webpage 100.

Activation of the softkey 106 activates the agent access applet 108. The agent access applet 108, in turn, interacts with the terminal of the client 22, 24, 26, 28 to set up an independent communication connection between the client 22, 24, 26, 28 and agent 30, 32, 36. Independent, in this context, means the provision of a communication connection that does not interfere with access to the website 38 or with the downloading of webpages 100 to the client 22, 24, 26, 28.

The agent access applet 108 may be structured under any of a number of different formats. For example, where the port identifier 110 is a telephone number, the applet 108 may first search a resources list of the terminal 22, 24, 26, 28 for a non-interfering interface with a switched circuit voice channel. In the case where the terminal 22, 24 is coupled directly to the Internet or to the Internet through an Internet Service Provider (ISP), then the only non-interfering voice channel may a logical channel under VoIP In the case of VoIP, a first portion of the communication connection between a client (e.g., 22) and an agent (e.g., 30) may be set up under a VoIP format within the Internet and second portion of the connection may be set up as a switched circuit connection within the PSTN 18. The functionality of the agent access applet 108, in this case, may be provided by any of a number of existing object-oriented software applications (e.g., dialpad.com).

Under the illustrated example, the applet 108 forms a VoIP connection between the client 22 and the gateway 50. The applet 108 also transfers the port identifier (i.e., the telephone number) 110 to the gateway 50 as a call destination. The gateway 50, in turn, transfers the telephone number 110 to the PSTN 18 as part of a call set up message. The PSTN 18 forms the switched circuit connection between the gateway 50 and ACD 20 or remote agent 36. Where the call is routed to the ACD 20, the ACD 20 forms the final leg of the connection between the client 22 and agent 30.

Within the ACD 20, the port identifier 110 may functionally identify a particular trunk on a set of incoming trunks 52. The identity of the trunk receiving the call may alert the CPU 45 as to the agent destination and may route the call accordingly.

While the applet 108 under this particular example relies upon VoIP, the use of VoIP in the system 10 differs from prior art uses in a number of regards. For example, prior art uses of VoIP (e.g., Netphone, Webspeak, etc.) have typically required the installation of similar VoIP software in the computers at both ends of the connection. The agent access applet 108 differs from prior art VoIP applications in a number of regards.

For example, the agent access applet 108 is a relatively small, single use file (300 kb) that is included within and downloaded with the webpage 100 from the website 38. Further, the applet 108 is directed to a single call destination for any particular downloaded webpage 100. While the call destination (port identifier 110) is easily changed by the operator of the system 10, the port identifier 110 is not readily available to the client 22. As such, the applet 108 functions as a software robot to set up a connection with a predetermined destination in accordance with its instructions in response to activation of the softkey 106 by the client 22.

The independent creation of a communication link between a client 22, 24, 26, 28 and agent 30, 32, 36 simplifies use of the website 38 by allowing the client 22, 24, 26, 28 to remain at the website 38 viewing webpages 100 while simultaneously conversing with the agent 30, 32, 36 through the headset and soundblaster card within his terminal 22, 24. Further, by separately addressing each webpage to a different predetermined port identifier (i.e., different agent), calls from clients to be automatically directed to the best qualified agent Client access from a terminal 26 that includes a cellphone may be accomplished in a similar manner. In this case, the terminal 26 may access the website 38 through the cellular infrastructure 16 and the Internet 12. Since the terminal 26 is a mobile device, it may not have a permanent URL assigned to it and may, instead, be assigned a temporary URL allocated for use by the cell system 16 during a current data session.

Upon accessing the website 38, the temporary URL may be transferred to a URL analyzer 56 within the host 14 that may function to identify and determine a locale associated with the temporary URLs assigned to portable terminals 26, 28. Temporary URLs and their locale may be identified by any of a number of known methods (e.g., comparison of URLs with a list of URLs reserved for cellular use in each locale, comparison of a URL suffix with known paths to cellular systems, etc.).

Further, by associating temporary URLs (and terminals 26, 28) with locale, targeted webpages 100 may be delivered. Targeted webpages 100 may be appropriate in the case of a merchant with a local presence. Where targeted webpages are delivered to a terminal 26, 28 in the locale of the merchant, a telephone number 110 of a local agent may be included within the applet 108 of the targeted webpage.

Figure 3:
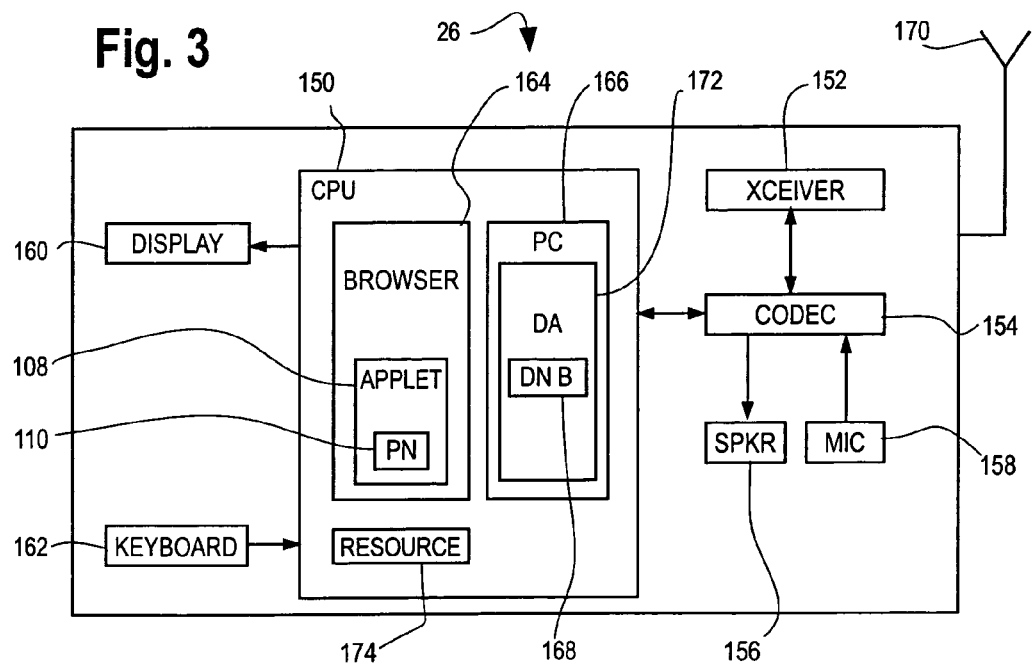
FIG. 3 is a block diagram of one of the portable devices of FIG. 1.

FIG. 3 is a block diagram of the terminal 26. As shown, a transceiver 152 may be provided for exchanging signals with a local base station antenna 62. Signals received by the transceiver 152 may be routed to a coder/decoder (CODEC) 154.

The CODEC 154 may be hard-coded to exchange logical signals between the cellular system 16 and three separate logical entities (three separate code plugs) within the terminal 26. A first code plug may be coupled to a voice channel and may include the speaker 156 and microphone 158 of the cellular phone portion of the terminal 26. A second code plug may include a phone control section 166. A third code plug may include a browser 164 of the Internet interface.

Upon receipt of any webpages 100 downloaded from the website 38, the CODEC 154 routes the webpages 100 to the browser 164. The browser 164, in turn, displays the webpages 100 on the display 160.

If the operator should activate the applet 108, then the applet searches a resource list 174 of the CPU 150 for a second communication channel. Upon searching the list, the applet 108 may locate a dialing application 166 of the cell phone portion of the terminal 26. Upon locating the dialing application 166, the applet 108 may insert the port identifier 110 into a dialed number buffer 168 and activate the dialing application 166. The dialing application 166, in turn, sets up a voice channel between the agent 30, 32, 36 of the website 38 and client 26.

Since the dialing application 172 resides within the phone control 166, it represents a separate logical entity than that of the browser 164. Further, set-up of a telephone connection through the voice channel code plug allows the client to continue to download webpages 100 through the browser code plug.

Figure 4:
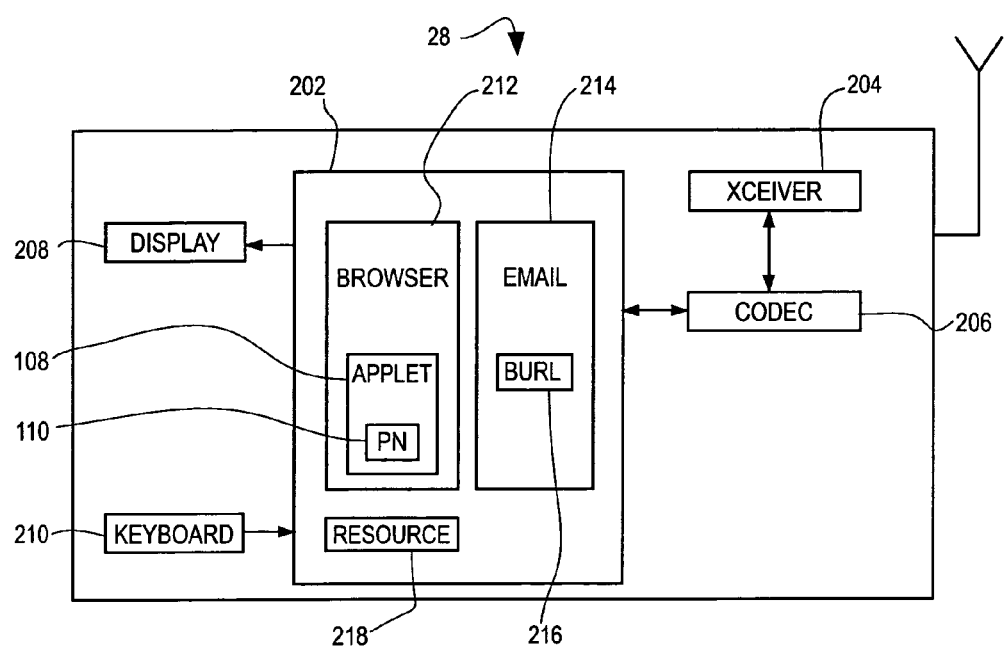
FIG. 4 is a block diagram of another one of the portable devices of FIG. 1.

Agent access through a PDA 28 may function in a similar manner. FIG. 4 is a block diagram of the PDA 28.

As shown, the PDA 28 may include a transceiver 204 and CODEC 206. The CODEC 206 may function to exchange information between the Internet 12 and two logical entites (code plugs) within the PDA 28. The first code plug may be with the browser 212 and the second code plug may be with a data exchange (e.g., email) application 214.

The client 28 may access the website 38 through the browser 212 and request webpages 100. As with the terminal 26, the URL analyzer 56 within the host 14 may identify the temporary URL assigned to the terminal 26 and may download a targeted webpage 100 to the client 28. In this situation, the port number 110 may be an e-mail address of a local agent 36.

Upon activating the softkey 106, the applet 108 may search the resources list 218 of the terminal 28 and locate the data application 214. Upon locating the data application 214, the applet 108 may transfer the port identifier (e.g., e-mail address of a local agent 36) 110 to the data application 214 and activate the data application 214.

Upon activation of the data application 214, the user of the PDA 28 may enter any appropriate query and activate a SEND button. In response to activation of the SEND button, the e-mail message is sent to the local agent 36 through the Internet 12 and PSTN 18.

Under another illustrated embodiment of the invention, session information may be provided by the applet 108 to help the agent 30, 32, 36 receiving the call understand the context of the call. The session information may provide a visitation history of webpages 100 visited by the user of the terminal 22, 24, 26, 28 before the call was placed to the agent 30, 32, 36. The visitation history may be forwarded to the agent upon call delivery in order to allow the agent 30, 32, 36 to quickly familiarize himself with any visited webpages 100 and to answer any question posed by the client 22, 24, 26, 28 without the necessity of asking questions directed to identifying the webpage source of the client's concern.

The session information may be obtained under any of a number of different methods. For example, once the applet 108 is activated, the applet 108 may retrieve URLs of webpages 100 from a "COOKIES" file within the browser of the client 22, 24, 26, 28. Alternatively, the URLs or a session identifier may be appended to the applet 108 before the associated webpage 100 is downloaded to the client 22, 24, 26, 28.

Once the applet 108 has been provided with the session information, it may be forwarded to the agent receiving the call using any of a number of different methods. In the case of the VoIP call through the gateway 50, the session information may be packetized and sent to the gateway 50 as call associated information. Within the gateway 50, the session information may be forwarded to its destination through the PSTN 18 within a user part of an ISDN "D" channel.

In the case where the destination is an agent 30, 32 within the ACD 20, a CPU 54 within the ACD 20 may receive the session information and forward the information along with an agent identifier to the host 14. The host may use the agent identifier and session information to deliver the appropriate webpages 100 to the terminal 44, 46 of the agent 30, 32 at the same instant that the ACD 20 delivers the call to the console 40, 42 of the agent 30, 32.

In the case of the portable terminals 26, 28, the session information may be obtained by the applet 108 from the terminal 26, 28 in a similar manner. Once activated, the portable device 26, 28 may also deliver the session information to an agent 30, 32, 36 through an ISDN "D" channel.

In the case of the remote agent 36, a local cache 62 within a memory of a terminal of the agent 36 may be provided for storage of the information content 102, 104 of the webpages 100. Once a call is received from a client 22, 24, 26, 28, the session information is used to retrieve and display any visited webpages 100. The webpages 100 may be reviewed by the agent 36 on a display of the terminal of the agent 36 as the agent 36 converses with the client 22, 24, 26, 28.

Under another illustrated embodiment, the host 14 may broadcasts Internet ads (e.g., html mini-webpages 100) to any portable device 26, 28 within the service coverage area of predetermined base stations 62. The ads are created based upon the needs of businesses located within the service coverage area 62. Each ad is constructed with content 102, 104 selected by the local business and an applet 108 that may include a port number of an agent 36 of the business. Where a user of the portable device 26, 28 activates the softkey 106, the user is placed into contact with the agent 36. When placed in contact, the agent 36 may answer any specific questions or explain any special offers displayed on the mini-webpage 100.

A specific embodiment of a method and apparatus for providing web callback through multi-media devices according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of establishing a communication connection between a client of a website and an agent of the website, such method comprising the steps of:

downloading a webpage from the website to the client, such webpage including an embedded agent access applet and a communication system port identifier of the agent, said communication port identifier of the agent being different than a communication port identifier of the web site;

activating the agent access applet within the downloaded webpage; and forming a communication connection between the client and the communication system port of the agent based upon operation of the activated applet and where the communication connection is formed entirely under control of programming information contained within the downloaded webpage.

2. The method of establishing the communication connection as in claim 1 wherein the communication system port identifier further comprises a telephone number.

3. The method of establishing the communication connection as in claim 1 wherein the communication system port identifier further comprises a universal resource locator.

4. The method of establishing the communication connection as in claim 1 further comprising establishing the communication connection between the client and an Internet gateway under a voice-over-Internet-protocol format and between the Internet gateway and the agent through the public switch telephone network.

5. The method of establishing the communication connection as in claim 1 further comprising downloading a session identifier to a contact center through the communication channel.

6. The method of establishing the communication connection as in claim 5 further comprising retrieving a webpage contact list of the client from a host of the website based upon the downloaded session identifier.

7. The method of establishing the communication connection as in claim 6 further comprising downloading a webpage contact list to the agent based upon the downloaded session identifier.

8. The method of establishing the communication connection as in claim 1 further comprising downloading session information from the client to the agent through the communication channel.

9. The method of establishing the communication connection as in claim 8 wherein the session information further comprises an identifier of a webpage downloaded by the client.

10. The method of establishing the communication connection as in claim 9 further comprising retrieving the identified webpage from a memory of the agent.

11. The method of establishing the communication connection as in claim 1 further comprising broadcasting the webpage to the client from a local cellular base station.

12. An apparatus for establishing a communication connection between a client of a website and an agent of the website, such apparatus comprising:

means for downloading a webpage from the website to the client, such webpage including an embedded agent access applet and a communication system port identifier of the agent, said communication port identifier of the agent being different than a communication port identifier of the web site;

means for activating the agent access applet within the downloaded webpage; and means for forming a communication connection between the client and the communication system port of the agent based upon operation of the activated applet and where the communication connection is formed entirely under control of programming information contained within the downloaded webpage.

13. The apparatus for establishing the communication connection as in claim 12 wherein the communication system port identifier further comprises a telephone number.

14. The apparatus for establishing the communication connection as in claim 12 wherein the communication system port identifier further comprises a universal resource locator.

15. The apparatus for establishing the communication connection as in claim 12 further comprising means for establishing the communication connection between the client and an Internet gateway under a voice-over-Internet-protocol format and between the Internet gateway and the agent through the public switch telephone network.

16. The apparatus for establishing the communication connection as in claim 12 further comprising means for downloading a session identifier to a call center through the communication channel.

17. The apparatus for establishing the communication connection as in claim 16 further comprising means for retrieving a webpage contact list of the client from a host of the website based upon the downloaded session identifier.

18. The apparatus for establishing the communication connection as in claim 17 further comprising means for downloading a webpage contact list to the agent based upon the downloaded session identifier.

19. The apparatus for establishing the communication connection as in claim 12 further comprising means for downloading session information from the client to the agent through the communication channel.

20. The apparatus for establishing the communication connection as in claim 19 wherein the session information further comprises an identifier of a webpage downloaded by the client.

21. The apparatus for establishing the communication connection as in claim 20 further comprising means for retrieving the identified webpage from a memory of the agent.

22. The apparatus for establishing the communication connection as in claim 12 further comprising means for broadcasting the webpage to the client from a local cellular base station.

23. An apparatus for establishing a communication connection between a client of a website and an agent of the website, such apparatus comprising:

a webpage, an agent access applet with a communication system port identifier of the agent embedded within the webpage, said communication port identifier of the agent being different than a communication port identifier of the web site;

a website adapted to download the webpage to the client;

a softkey on the webpage adapted to activate the agent access applet within the downloaded webpage; and a communication connection formed between the client and the communication system port of the agent based upon operation of the activated applet and where the communication connection is formed entirely under control of programming information contained within the downloaded webpage.

24. The apparatus for establishing the communication connection as in claim 23 wherein the communication system port identifier further comprises a telephone number.

25. The apparatus for establishing the communication connection as in claim 23 wherein the communication system port identifier further comprises a universal resource locator.

26. The apparatus for establishing the communication connection as in claim 23 wherein the communication connection further comprises a first portion formed between the client and an Internet gateway under a voice-over-Internet-protocol format and a second portion formed between the Internet gateway and the agent through the public switch telephone network.

27. The apparatus for establishing the communication connection as in claim 23 further comprising a session identifier downloaded to a contact center through the communication channel.

28. The apparatus for establishing the communication connection as in claim 27 further comprising a central processing unit within the contact center adapted to retrieve a webpage contact list of the client from a host of the website based upon the downloaded session identifier.

29. The apparatus for establishing the communication connection as in claim 23 further comprising the host processor adapted to download a webpage contact list to the agent based upon the downloaded session identifier.

30. The apparatus for establishing the communication connection as in claim 23 further comprising an integrated digital services user part adapted to download session information from the client to the agent through the communication channel.

31. The apparatus for establishing the communication connection as in claim 30 wherein the session information further comprises an identifier of a webpage downloaded by the client.

32. The apparatus for establishing the communication connection as in claim 31 further comprising a memory adapted to provide the identified webpage.

33. The apparatus for establishing the communication connection as in claim 23 further comprising a local cellular base station adapted to broadcast the webpage to the client.

34. A method of establishing a voice call connection between a call center and a client of the call center, such method comprising the steps of:

downloading a webpage including a VoIP applet from a website of the call center to the client, such webpage including a telephone number of the call center embedded within the downloaded webpage;

activating the VoIP applet within the downloaded webpage;

forming a VoIP voice connection between the client and a public switch telephone network gateway based upon operation of the activated applet; and setting up a voice call between the gateway and call center using the downloaded telephone number of the call center and where the voice call is set up entirely under control of programming information contained within the downloaded webpage.

35. A method of establishing a voice call connection between a call center and a client of the call center, such method comprising the steps of:

downloading a webpage including a VoIP applet from a website of the call center to the client, such webpage including a telephone number of the call center embedded within the downloaded webpage;

activating the VoIP applet within the downloaded webpage; and automatically setting up a voice call between a terminal of the client and call center based upon operation of the applet and the downloaded telephone number of the call center and where the voice call is set up entirely under control of programming information contained within the downloaded webpage.

* * * * *